United States Patent [19]

Dutton

[11] 4,429,829
[45] Feb. 7, 1984

[54] INTERACTIVE DUAL PROBE TEMPERATURE CONTROL SYSTEM

[75] Inventor: Edmund L. Dutton, Marietta, Ohio

[73] Assignee: Mallinckrodt, Incorporated, St. Louis, Mo.

[21] Appl. No.: 323,476

[22] Filed: Nov. 20, 1981

[51] Int. Cl.³ .................. G05D 15/00; A01G 23/10
[52] U.S. Cl. .................. 236/78 B; 236/3; 236/9 R; 236/46 F; 237/3
[58] Field of Search .......... 236/9 R, 9 A, 2, 78 B, 236/91 F, 91 E, 46 R, 46 F, 3, 4, 5, 6; 165/12, 28; 237/3

[56] References Cited

U.S. PATENT DOCUMENTS

| | | | |
|---|---|---|---|
| 1,074,578 | 9/1913 | Stenberg | 236/4 |
| 2,451,566 | 10/1948 | Lehane et al. | 257/3 |
| 2,556,065 | 6/1951 | Callender | 236/91 E |
| 2,572,293 | 10/1951 | Wilson et al. | 236/91 |
| 3,112,791 | 12/1963 | Brahm | 165/28 |
| 3,408,004 | 10/1968 | Miller | 236/9 |
| 3,450,862 | 6/1969 | Kralovec, Jr. | 219/494 |
| 3,724,534 | 4/1973 | Weatherston | 165/12 |
| 3,761,018 | 9/1973 | Rekai | 236/91 |
| 3,768,545 | 10/1973 | Wills | 165/27 |
| 4,089,462 | 5/1978 | Bradford | 236/68 B |
| 4,189,093 | 2/1978 | Schnaibel et al. | 236/37 |
| 4,262,491 | 4/1981 | Chorey et al. | 236/91 F |
| 4,344,565 | 8/1982 | Kojima et al. | 165/12 |

FOREIGN PATENT DOCUMENTS 2019616  10/1979  United Kingdom .......... 236/91 F

OTHER PUBLICATIONS

Anderson et al., Comfort Control for Central Electric Heating Systems, *IEEE Transactions on Industry Applications*, vol. IA-10, No. 6, pp. 741-745, Nov./Dec. 1974.

*Primary Examiner*—William E. Wayner
*Assistant Examiner*—Harry Tanner
*Attorney, Agent, or Firm*—Cushman, Darby & Cushman

[57] ABSTRACT

A dual probe interactive, control system for accurately controlling the temperature within a specified area has a controlling temperature probe located for fast response times and used in association with a controllable setpoint for modulating a heating/cooling source. An indicating/reference temperature probe is also placed in the same enclosure at an optimum location for indicating actual temperature. The actual temperature is compared to the desired temperature to detect any droop or offset and the controllable setpoint is then adjusted accordingly.

11 Claims, 3 Drawing Figures

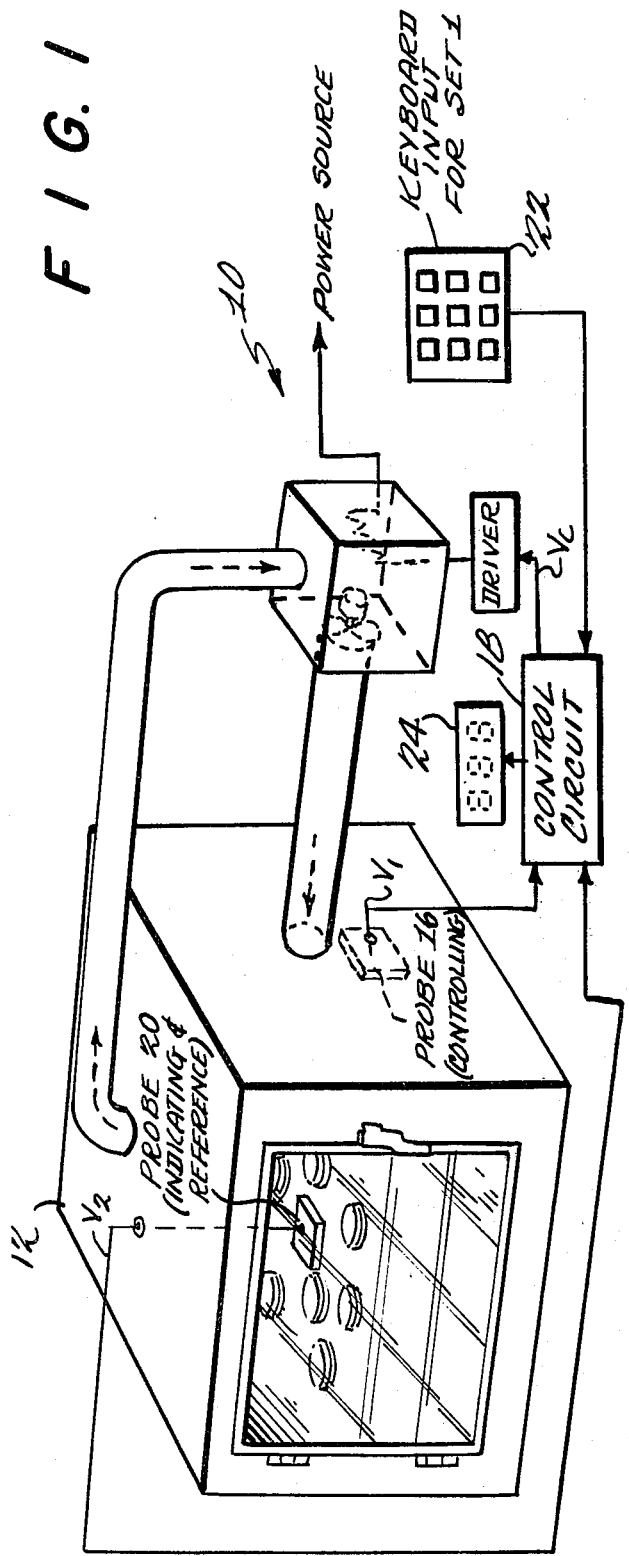
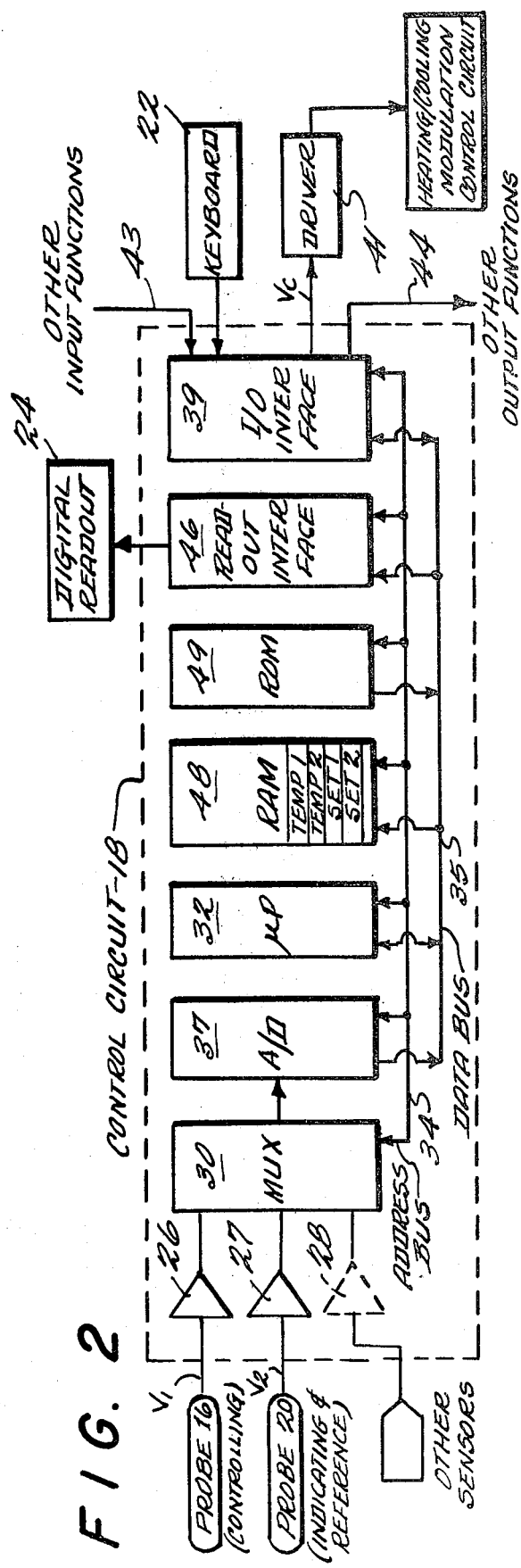

INTERACTIVE DUAL PROBE TEMPERATURE CONTROL SYSTEM

BACKGROUND OF THE INVENTION

The present invention is for a temperature control system and is more particularly directed to such systems utilizing more than one temperature probe for accurately controlling the temperature within a given area.

The problem of accurately controlling temperatures within an enclosure is an old one. If a temperature controlling thermostat is placed near a heating/cooling source, desirable fast response times are obtained for modulating the heating/cooling source. However, at the same time, the actual temperature within much of the enclosure (e.g. at its geometrical mean) differs from the thermostat set point. The amount of this differernce is sometimes called "droop" or "offset" and it varies with changes in the thermal load presented to the system. For example, in an incubator enclosure, droop may increase significantly for a time after the enclosure is opened and an object is inserted having a much different temperature from the ambient incubator temperature. This invention is directed to the substantial solution of this problem by the use of interactive dual temperature probes employed at different locations within the same enclosure. These probes are used to actually measure the existing droop associated with the probe used to control the heating/cooling source and to automatically adjust its set point so as to more accurately maintain the actually desired temperature with changing thermal loads.

Temperature control systems utilizing more than one temperature probe are well known in the art. The temperature information measured by such plural temperature probes has been utilized in a variety of ways as illustrated by the following U.S. Pat. Nos.:

4,189,093 Schnaibel et al
4,089,462 Bradford
3,768,545 Wills
3,761,018 Rekai
3,724,534 Weatherston
3,450,862 Kralovec, Jr.
3,408,004 Miller
3,112,791 Brahm
2,572,293 Wilson et al
2,451,566 Lehane et al In certain of the prior art references, such as the Bradford and Rekai references, one thermostat is placed inside and one thermostat is placed outside of the area which is to be temperature controlled. The thermostat inside the area of interest is used to control a heat source. The thermostat outside of the area of interest is used to monitor the outside ambient temperature. In response to changes in the outside ambient temperature, the output point of the inside thermostat is supplemented to compensate for detected changes in the outside temperature.

Prior art multiple probe temperature control systems often utilize plural temperature probes to obtain an average temperature. Such a system is disclosed in U.S. Pat. No. 2,572,293. A similar utilization of the signals produced by the temperature probes is illustrated in U.S. Pat. No. 3,724,534 wherein the amount of heating and cooling supplied is controlled by an electronic scanning system which periodically samples each of the zone thermostats. The overall heating and cooling means is adjusted according to the sum of the zone requirements.

It is also known in the prior art to use two temperature sensors each for controlling the operation of a heat source as illustrated in U.S. Pat. Nos. 3,450,862 and 2,451,566. Prior art temperature control systems also utilize multiple temperature sensors in a variety of other ways. In U.S. Pat. No. 4,189,093 three temperature sensors are utilized. Two are connected in series, one insulated and one uninsulated, so as to provide a dynamic, sensitive and accurate measurement of the temperature in the area near the heat source. In U.S. Pat. No. 3,768,545 a first thermostat is located in the discharge air passage and a second thermostat is located in the return air passage. A selection circuit energizes one of the thermostats below a preset temperature and the other thermostat above the preset temperature. In this manner, only one of the thermostats is operative at a time. In U.S. Pat. No. 3,408,004 a low and high thermostat control the heat supplied to a source of hot water. A space thermostat controls the heat supplied to the monitored space while a water thermostat monitors the overall water temperature. In U.S. Pat. No. 3,112,791 two temperature probes are utilized, one to turn the heat source off and on and one to limit the rate of change of the air temperature in a supply duct.

As can be seen, prior art temperature control systems utilizing more than one temperature sensor are well known. The prior art systems utilize the temperature sensors in a variety of ways including at least those discussed above. However, none is believed to teach or suggest my unique and advantageous arrangement of interactive dual temperature probes employed at different locations within the same enclosure so as to measure the actual "droop" parameter associated with the probe used to control heating/cooling and to automatically adjust its set point so as to more accurately maintain the actually desired temperature with changing thermal loads.

SUMMARY OF THE PRESENT INVENTION

My invention provides an interactive, two temperature probe method and apparatus for measuring and controlling temperature within a defined space. One temperature probe is placed for optimum indication of the actual space temperature. It is also used as a reference for adjusting the control or setpoint associated with the other temperature probe which is placed for optimum control of the heating/cooling source. This allows optimum placement of both the control and the indicating control within the defined space while at the same time automatically correcting for changing droop or offset so as to achieve precise and accurate temperature control. This type of control is especially useful for incubators or the like where accurate temperature control may be critical.

The presently preferred exemplary embodiment is a microprocessor-based, interactive, dual probe, temperature control system for accurately controlling the temperature within a specified area. An input circuit (e.g. keyboard) permits manual entry of the desired temperature. The actual setpoint temperature used for controlling the heating/cooling source is also initially made equal to this desired temperature. A first controlling temperature sensor or probe is located in the specified area near a heating/cooling source thermal input for providing a rapid response signal representative of the temperature near the heating/cooling source. A second indicating/reference temperature sensor or probe is located within the specified area so as to provide a second output signal representative of the actual temperature in the "working area". A microprocessor-based control circuit compares the control probe output signal to the desired temperature and controls the heating/cooling source accordingly. From time to time the control circuit also measures any difference between the indicating/reference probe output signal and the desired temperature. This difference is added or subtracted (as appropriate) from the set point temperature used for controlling the heating/cooling source so as to compensate for any thus detected droop or offset. In this manner, the set point temperature at which the heating/cooling source is activated is continually adjusted in real time in response to the indicating/reference temperature sensor such that the actual temperature within the specified area is kept substantially equal to the desired temperature regardless of changes in the thermal loading.

BRIEF DESCRIPTION OF THE DRAWINGS

FIG. 1 is a diagram, partially in perspective, illustrating an exemplary dual probe, interactive, control system constructed according to the teachings of the present invention for accurately controlling the temperature within a specified area;

FIG. 2 is a block diagram of the exemplary control circuit illustrated in FIG. 1.

DESCRIPTION OF THE PREFERRED EXEMPLARY EMBODIMENT

Figure 3:
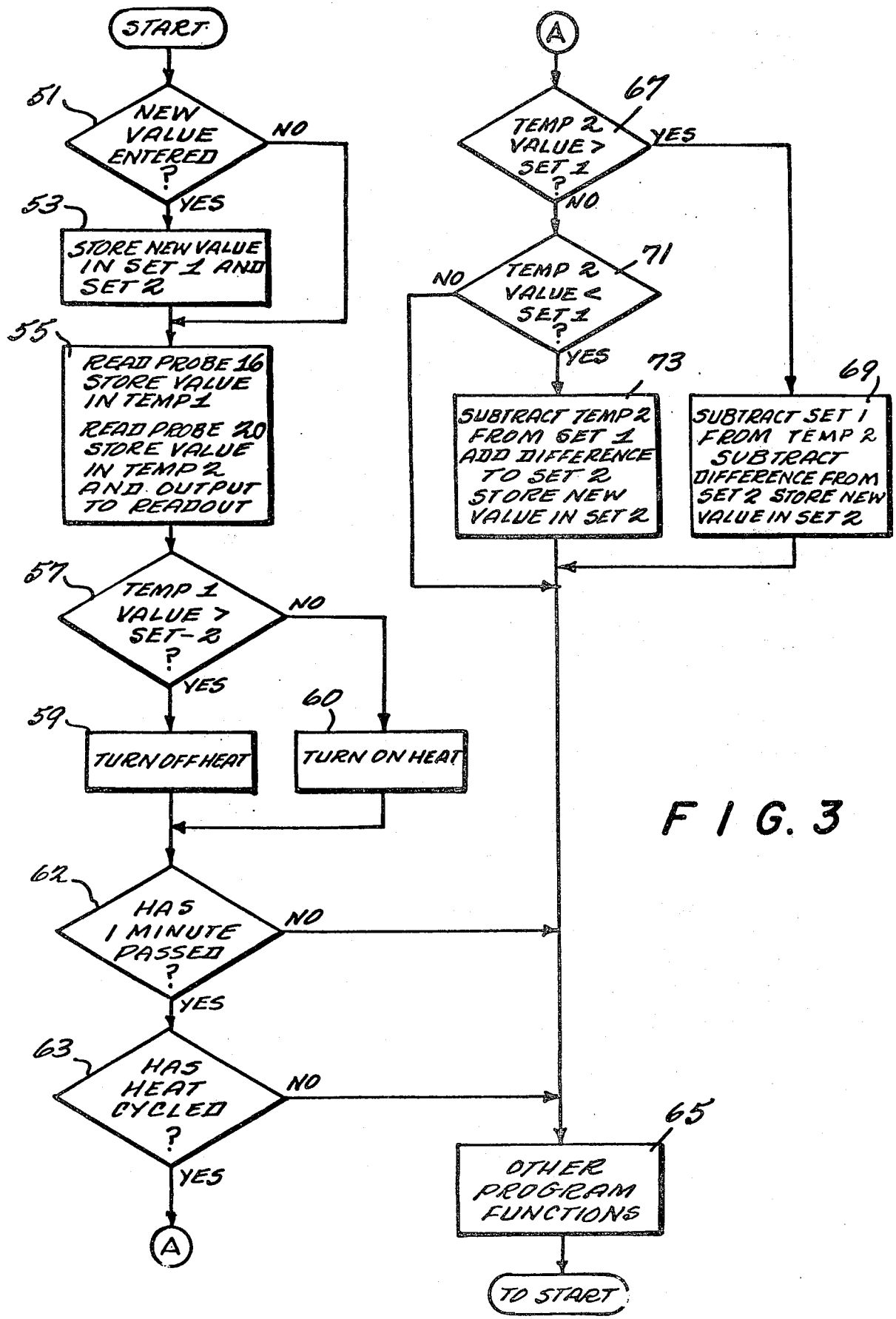
FIG. 3 is an exemplary flow chart of the relevant portions of a suitable computer program outlining the operation of the exemplary control system illustrated in FIG. 1.

In FIG. 1 an interactive, dual probe, temperature control system 10 constructed according to the teachings of the present invention for accurately controlling the temperature within a specified area 12 is illustrated. The specified area 12 may be an incubator or the like having doors or other controlled openings through which objects of differing thermal properties may be inserted and/or withdrawn so as to change the thermal load of the system. A conventional heating/cooling thermal source 14 is provided for supplying the heating/cooling requirements of the specified area 12.

A first (controlling) temperature probe 16 is preferably located near the heating/cooling input from thermal source 14 so as to provide optimum, fast controlling response times for modulating the thermal input from source 14. The first temperature probe 16 produces a first output signal $V_1$ (representative of the temperature TEMP1 in the area 12 near the heating/cooling input from source 14) which is input to a control circuit 18.

A second (indicating/reference) temperature probe 20 is also located within the specified area 12 and is located for optimum indication (i.e., accuracy) of the actual temperature in a desired work area (e.g., the geometric means) of the enclosed area 12. It produces a second output signal $V_2$ (representative of the actual existing temperature TEMP2 within a desired portion of the specified area 12). Probes 16 and 20 are temperature sensing elements of conventional design such as one hundred or one thousand ohm platinum resistance temperature detectors. They may also typically be thermistors, thermocouples or semiconductor temperature sensors if desired.

A manual input circuit 22 (e.g., keyboard or pushbutton switches, potentiometer, etc.) provides digital or analog signals representative of the temperature desired in the specified area 12. These signals are input to the control circuit 18. The control circuit 18 (which may or may not be digital as should be appreciated) produces an output control signal $V_C$ based on the just described inputs which output control signal is used to conventionally control (e.g., modulate) the operation of the heating/cooling source 14. The control circuit 18 may also produce signals for a display unit 24 for displaying various desired parameters (e.g. actual temperature and/or latest controlling set point value, etc.) of the control system 10.

In operation the control circuit 18 records the desired area temperature input via keyboard 22 and initially makes the control set point used for probe 16 equal to this desired temperature. When the heating/cooling source has finished an on/off cycle, the actual temperature measured by probe 20 is compared to the desired temperature. If any droop or offset is detected, the control set point used for probe 16 is adjusted in a direction to eliminate the droop. Within a few iterations, the actual probe 20 temperature is thus forced to equal the desired temperature—i.e., the existing droop at any given time is actually measured and fully compensated. Thus, the control system 10 is a dynamic, interactive control system wherein the set point at which the heating/cooling source 14 is activated is continually adjusted in an iterative manner in response to the thermal loading such that the temperature within the specified area 12 is accurately maintained.

In FIG. 2, an exemplary microprocessor-based control circuit 18 is illustrated in block diagram form. The probe 16 output signal $V_1$ representing TEMP1 and the probe 20 output signal $V_2$ representing TEMP2 are input to a conventional multiplexer 30 through first and second conventional signal conditioning circuits 26 and 27, respectively (typically utilizing operational amplifiers configured to produce an output consistent with the input range of the analog-to-digital converter to be employed). In a control system having functions in addition to accurately maintaining the temperature, additional input signals may be input to the multiplexer 30 through additional signal conditioning circuits 28. The output of the multiplexer 30, which is the time multiplexed input signals $V_1$ and $V_2$, is input to a conventional analog to digital converter 37. The analog to digital converter 37 is conventionally connected to a conventional microprocessor 32 through an address bus 34 and a data bus 35. The multiplexer 30 is also connected to the microprocessor 32 through the address bus 34. The microprocessor 32 controls the operation of the multiplexer 30 and the analog to digital converter 37 conventionally so as to cause the first and second output signals $V_1$ and $V_2$ to be converted to digital form and made available on the data bus 35 at any desired times.

An input/output port 39 receives the digital input from keyboard 22 and makes it available via the bus systems in accordance with conventional digital signal processing techniques. The input/output port 39 also outputs the control signal $V_C$ through a suitable signal conditioning or driver circuit 41. In a control system having functions in addition to accurately monitoring the temperature, additional input signals may also be input at an input 43 and additional output signals may be similarly made available at an output 44.

A second conventional input/output port 46 supplies suitable output digital signals to the display unit 24. The first and second input/output circuits 39 and 46 are each conventionally connected to the microprocessor 32 through the address bus 34 and the data bus 35.

A random access memory (RAM) 48 and a read only memory (ROM) 49 are each also conventionally connected to the microprocessor 32 through the address bus 34 and the data bus 35. The microprocessor 32 controls the operations of the control circuit 18 in response to a stored program contained in the ROM 49. This information includes program instructions for operating the control system 10, which instructions are outlined in FIG. 3, as well as other instructions necessary for controlling the operation of the control circuit 18 for any other functions which it may be assigned to perform. The RAM 48 is utilized by the microprocessor 32 for temporary storage and includes at least the following assigned data:

TEMP1 = temperature sensed by probe 16
TEMP2 = temperature sensed by probe 20
SET1 = desired temperature set manually
SET2 = control setpoint used in conjunction with TEMP2 from probe 20 to control heating/cooling modulation—initially equal to SET1 and then iteratively adjusted to compensate for droop or offset The programmed instructions in the ROM 49 and the use of the memory locations in the RAM 48 are discussed in further detail in conjunction with FIG. 3 hereinbelow.

The components illustrated in FIG. 2 which comprise the control circuit 18 may be of the type listed in Table I.

TABLE I

| Component | Manufacturer | Part Number |
| --- | --- | --- |
| Signal Cond. Ckts 26, 27 and 28 | Harris | 741 |
| Multiplexer 30 | Nat'l Semiconductor | CD4529BC |
| A/D Converter 37 | Nat'l Semiconductor | 801 |
| Microprocessor 32 | Motorola | 6802 |
| RAM 48 | included in the Motorola 6802 | |
| ROM 49 | Intel | 2716 |
| I/O Port 46 | Intersil | ICM7211 |
| I/O Port 39 | Motorola | 6821 |

Turning to FIG. 3, an outline of the relevant programmed instructions stored in the ROM 49 is illustrated. It is understood that when instructions call for storing data, such data is stored in the RAM 48. In this manner the program instructions stored in the ROM 49 control the operation of the microprocessor 32 and the manipulation and storage of data in the RAM 48.

At first step 51, the microprocessor 32 determines if a new value for the desired temperature (SET1) has been entered. If a new value has been entered, the microprocessor 32 stores the value in the two memory locations SET1 and SET2 as shown in step 53. Both SET1 and SET2 are originally equal to the desired temperature. After the values of SET1 and SET2 have been stored, or if no new value has been entered, the microprocessor, at step 55, reads the value of the first temperature probe 16 and the second temperature probe 20 and stores the digital values (corresponding to $V_1$ and $V_2$) in TEMP1 and TEMP2. At this point the microprocessor 32 may also direct the display unit 24 to display TEMP2, TEMP1, SET1 and/or SET2.

At decision step 57 the microprocessor 32 determines if TEMP1 is greater than SET2. If so, this indicates that the temperature in the desired region of the specified area 12 is greater than the desired temperature and the heat is turned off at step 59 (or, alternatively, the cooling unit is turned on). If the value of TEMP1 is not less than the value of SET2, this indicates that the temperature in the specified area 12 is less than the desired temperature. In this latter case, the heating unit is turned on at step 60 (or, alternatively, the cooling unit is turned off).

After the steps 59 or 60, the microprocessor determines if some predetermined time (e.g., one minute) has elapsed at decision step 62. The duration of the predetermined time period is typically related to the thermal time constant and may be chosen by multiplying the thermal time constant by two, for example. For a typical room ten feet in length, ten feet in width and eight feet high, having a typical heating/cooling source capacity the thermal time constant, i.e., the time required for a one degree step change, is approximately thirty seconds. Thus, the predetermined time period of one minute illustrated at step 62 is appropriate for an enclosed area having the above defined dimensions and having a typical heating/cooling source.

In a smaller enclosed area such as an incubator, it may be desirable to periodically recalculate the thermal time constant and to adjust the predetermined time associated with step 62 as it may change due to the addition or removal of objects from the incubator. This calculation may typically be carried out in a separate sub-routine.

One purpose of step 62 is to allow the temperature control system to stabilize. If the operative setpoint of the heating/cooling source 14 is adjusted too often, i.e., if the predetermined time period of step 62 is less than the thermal time constant, the system will not reach a steady state condition. Additionally, it is possible for the heating/cooling source 14 not to cycle off and on during the predetermined time period. Because of this, decision step 63 determines if the heating/cooling source 14 has cycled since it is undesirable to change the operative setpoint before the system has had a chance to reach a steady state condition under the latest setpoint. Thus, if either of the decision steps 62 or 63 are answered in the negative, the microprocessor 32 carries out other program functions as indicated by step 65. In the case of an incubator or other controlled atmosphere encosure, these other program functions may include the monitoring of oxygen, carbon dioxide, humidity or the recalculation of the thermal time constant as discussed above. After the other desired program functions have been carried out the microprocessor 32 returns or loops back to step 51 within a fairly short time interval.

After both decision steps 62 and 63 have been satisfied, the microprocessor 32 proceeds to decision step 67 wherein the value of TEMP2 is compared to the value of SET1. If it is greater than SET1, indicating that the temperature in the specified area 12 is greater than the desired temperature, the microprocessor 32 will subtract the value of SET1 from the value of TEMP2. This difference value is then subtracted from SET2 and the new value for SET2 is then stored. This is carried out at step 69. In this manner, the setpoint of the heating/cooling source 14 is lowered.

If the value of TEMP2 is not greater than SET1, a determination is made, at step 71, whether the value of TEMP2 is less than SET1. If so, this indicates that the temperature in the specified area 12 is less than the desired temperature, and the microprocessor will then subtract the value of TEMP2 from the value of SET1. This difference value will be added to the value of SET2 which new value will then be stored in SET2. This is accomplished by the microprocessor 32 at step 73. In this manner, the operative set point of the heating/cooling source 14 is raised. If the value of TEMP2 is equal to the value of SET1 indicating that the temperature in the specified area 12 is equal to the desired temperature (or after steps 69 and 73), the microprocessor 32 carries out the previously referenced other program functions indicated by block 65. In this manner, the control system 10 continually monitors the temperature of the desired area 12 and continually updates the setpoint at which the heating/cooling source 14 operates. Thus, the temperature within the specified area 12 is accurately maintained by this iterative process at the desired temperature.

As an example, assume that the enclosure (incubator, oven, etc.) is energized and the initial interior temperature is 20° C. A temperature of 37° C. is then entered on the keyboard.

At the program start, the microprocessor would recognize that a new value had been entered and store this new value in SET1 and SET2. Data from probe 16 and probe 20 would then be read and stored in TEMP1 and TEMP2 respectively. Data from probe 20 would also be output to the read-out 24. Next, the value of TEMP1 would be compared to SET2. Since TEMP1 would be less then SET2, the heat would be turned on. Next, an internal timer (an interrupt driven subroutine) would be read to see if one minute had passed. This time could be readily adjusted for different enclosure volumes or different thermal responses as discussed above. Assuming that one minute had not passed, the microprocessor 32 would then service other program functions and return to the start of the relevant subprogram shown. Eventually, after many loops through the program, one minute would have elapsed and the microprocessor 32 would check to see if the heat had cycled on or off. This would indicate that the enclosure was near operating temperature. The microprocessor 32 would now compare TEMP2 (the temperature in the area of interest) with SET1 (the temperature desired in the area of interest). If TEMP2 is greater than SET1, this indicates that the unit is controlling at too high a temperature. The difference between TEMP2 and SET1 is found, and SET2 is reduced by the same amount. If TEMP2 is less than SET1, this indicates that the unit is controlling at too low a temperature. Again, the difference is found and SET2 is increased by the same amount. If no difference exists between TEMP2 and SET1, no change is made to SET2.

It can be seen that any difference that exists between the actual temperature in the area of interest and the desired temperature in the area of interest acts to adjust the actual controlling setpoint up or down by the same amount. After several iterations, the desired and actual temperatures become identical. Since the system is constantly updating itself, any variations in loading or ambient conditions are compensated for.

It will be apparent to those skilled in the art that the above described control system may be implemented in a variety of ways utilizing hard-wired, analog or digital dedicated circuits as well as various types of programable shared processor type of circuits. A temperature responsive switch having a controllable set point might, for example, be used in place of the first temperature probe 16 for directly controlling the operation of the heating/cooling source 14.

In short, those skilled in the art will appreciate many possible modifications or variations of the exemplary embodiments here described which will nevertheless retain many of the novel and advantageous features of this invention. Accordingly, all such modifications and variations are intended to be included within the scope of the appended claims.

What is claimed is:

1. An interactive dual temperature sensing system for controlling temperature within a defined space, said system comprising:
   a controllable thermal source connected to provide thermal input to said defined space in at least one source location;
   a first temperature sensor position at a first location within said defined space relatively near said thermal input;
   a second temperature sensor positioned at a second location within said defined space relatively further from said thermal input than said first location; and
   an electronic control circuit connected to said source and to said first and second sensors including means for automatically controlling said source based on the temperature (TEMP1) sensed at said first location with respect to a controlling setpoint temperature (SET2) that is automatically adjusted to minimize the difference between the temperature (TEMP2) sensed at said second location and a particular desired temperature (SET1);
   said first location being at a location for achieving rapidly responsive control of said source;
   said second location being approximately at the optimum location for accurately indicating the true temperature of a desired portion of said defined space;
   said electronic control circuit including
      a digital data processor means programmed to store digital data representing the temperatures sensed by said first and second temperature sensors (TEMP1 and TEMP2 respectively), the temperature control set point (SET2) and the desired temperature (SET1),
      said digital data processor means also being programmed to iteratively adjust said setpoint data value (SET2) by incrementing/decrementing then existing setpoint (SET2) with the calculated difference in value between said desired and actual sensed temperature at said second location (SET1 and TEMP2 respectively);
      said digital data processor means being programmed to perform said incrementing/decrementing only after a predetermined elapsed time period greater than the thermal response time of the defined space.

2. An interactive dual temperature sensing system as in claim 1 wherein said second location is at the approximate geometric center of said defined space.

3. An interactive dual temperature sensing system as in claim 1 wherein said defined space comprises an incubator.

4. An interactive dual temperature probe system for controlling temperature within an enclosed space, said system comprising:
   a controllable thermal source;

a first temperature probe means positioned at a first location within said enclosed space and having an adjustable temperature control setpoint (SET2) associated therewith for controlling the operation of said thermal source with respect to sensed temperature (TEMP1) deviations from said setpoint;

a second temperature probe means positioned at a second location within said enclosed space for sensing the actual temperature (TEMP2) therein;

manually adjustable input means for defining a desired temperature (SET1) at said second location within said enclosed space; and automatic control means electrically connected to said first temperature probe means, to said second temperature probe means and to said manually adjustable input means for automatically detecting differences between the sensed actual temperature (TEMP2) and the defined desired temperature (SET1) and for automatically adjusting said temperature control setpoint (SET2) so as to reduce any such detected difference;

said first location being at a location for achieving rapidly response control of said source;

said second location being approximately at the optimum location for accurately indicating the true temperature of a desired portion of said enclosed space;

said automatic control means including
a digital data processor means programmed to store digital data representing the temperatures sensed by said first and second temperature probe means (TEMP1 and TEMP2 respectively), the temperature control setpoint (SET2) and the desired temperature (SET1), said digital data processor means also being programmed to iteratively adjust said setpoint data value (SET2) by incrementing/decrementing then existing setpoint (SET2) with the calculated difference in value between said desired (SET1) and actual sensed temperature (TEMP2) at said second location.

5. An interactive dual temperature probe system as in claim 4 wherein said second location is at the approximate geometric center of said enclosed space.

6. An interactive dual temperature probe system as in claim 4 wherein said enclosed space comprises an incubator.

7. A control system for accurately controlling the temperature within an incubator, said control system comprising:

input means for generating a reference signal (SET1) representative of a desired temperature;

a thermal source;

a first temperature sensor located in the specified area near said thermal source for providing a first output signal representative of the temperature (TEMP1) thereat;

a second temperature sensor located elsewhere in the specified area for providing a second output signal representative of the temperature (TEMP2) thereat; and microprocessor control means including a digital data microprocessor for comparing said first output signal (TEMP1) to a setpoint signal (SET2) for controlling said thermal source and for periodically comparing said second output signal (TEMP2) to said reference signal (SET1) for iteratively changing the value of said setpoint signal (SET2) by the difference between the temperature (TEMP2) measured by said second sensor and the desired temperature (SET1) such that the second sensor temperature (TEMP2) is maintained substantially equal to said desired temperature (SET1).

8. The control system of claim 7 wherein the input means includes a keyboard.

9. The control system of claim 7 including output means for displaying the temperature represented by the setpoint signal and the temperature represented by the second output signal.

10. A method of accurately controlling the temperature within a specified area, comprising:

sensing the temperature (TEMP1) at a first location within the specified area;

sensing the temperature (TEMP2) at a second location within the specified area;

controlling a thermal source based on said temperature (TEMP1) sensed at said first location with respect to a setpoint temperature (SET2);

calculating and waiting for a predetermined time period before automatically adjusting said setpoint temperature (SET2) so as to minimize the difference between the temperature (TEMP2) sensed at said second location and a particular desired temperature (SET1);

said waiting including waiting for the thermal source to cycle before automatically adjusting the setpoint temperature.

11. A method for accurately controlling the temperature within a specified area, comprising:

(a) generating a setpoint signal (SET2) originally representative of a desired temperature and a reference signal (SET1) continually representative of a desired temperature;

(b) generating a first output signal (TEMP1) representative of the temperature in the specified area near a thermal source;

(c) generating a second output signal (TEMP2) representative of the temperature elsewhere in said specified area;

(d) comparing said first output signal (TEMP1) to said setpoint signal (SET2);

(e) controlling said thermal source in response to said first-mentioned comparing step;

(f) comparing said second output signal (TEMP2) to said reference signal (SET1); and (g) modifying the value of said setpoint signal (SET2) in response to said second-mentioned comparing step such that the temperature (TEMP2) in the specified area is maintained substantially equal to the desired temperature (SET1);

(h) repeating steps (b) through (h), inclusive, thereby providing an iterative process;

wherein step (e) of controlling said thermal source includes the steps of turning off the source when the first output signal is greater than the setpoint signal and turning on the source when the first output signal is less than the setpoint signal; and wherein step (g) of modifying the value of said setpoint signal (SET2) includes the steps of calculating the difference (TEMP2−SET1) between the second output signal (TEMP2) and the reference signal (SET1), and adding said difference to said setpoint signal (SET2) when said second output signal (TEMP2) is less than said reference signal (SET1), and subtracting said difference from said setpoint signal (SET2) when said second output signal (TEMP2) is greater than said reference signal (SET1).

* * * * *